March 3, 1942. R. L. SMIRL 2,275,204
FLUID OPERATED CLUTCH
Filed April 20, 1939
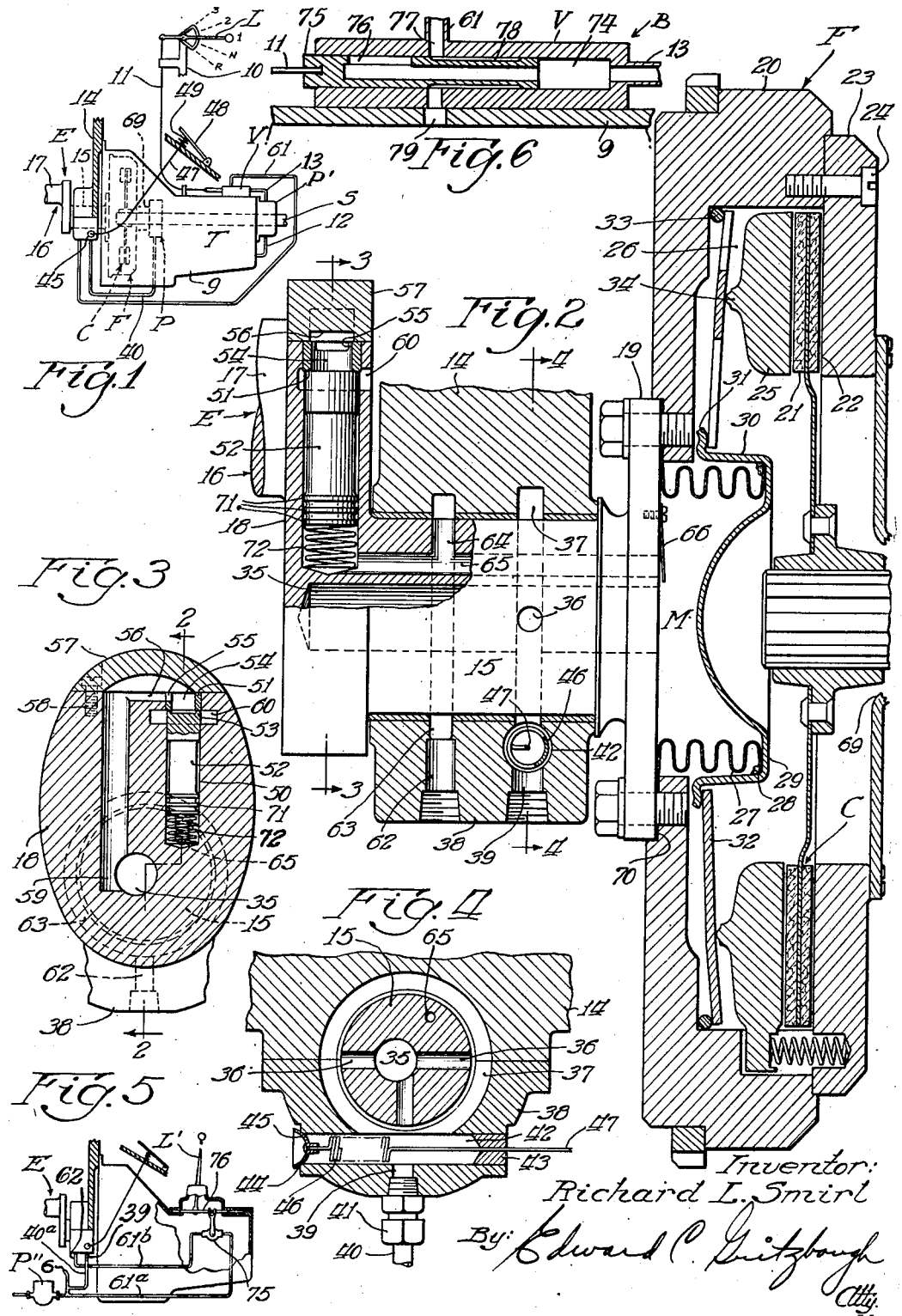
Inventor:
Richard L. Smirl
By Edward C. Gritzbough
Atty.

Patented Mar. 3, 1942

2,275,204

UNITED STATES PATENT OFFICE 2,275,204

FLUID OPERATED CLUTCH

Richard L. Smirl, Bellwood, Ill., assignor to Borg-Warner Corporation, Chicago, Ill., a corporation of Illinois Application April 20, 1939, Serial No. 268,851

11 Claims. (Cl. 192—85)

My invention relates to fluid operated clutches of the general type shown in the pending application of Harold Nutt and Richard L. Smirl for United States Letters Patent, Serial No. 232,664, filed September 30, 1938, wherein provision is made for either centrifugal operation of the clutch in response to changes in rotational speed thereof, or "locked out" engagement at speeds lower than those at which centrifugal engagement can occur.

A general object of the invention is to provide a clutch system of this type which is much simpler in construction than prior systems of the kind.

Specifically, the invention contemplates the location of the fluid motor which operates the clutch, directly within the periphery of the flywheel, between the clutch and the engine crankshaft, and the utilization of the crankshaft and of the engine rear main bearing, as housings for the operating parts of the clutch control mechanism. More specifically, the invention contemplates the arrangement of the motor in direct communication with the rear end of the crankshaft, the location of the speed responsive control valve in a throw of the crankshaft, and the location of a manual control valve in the rear main bearing of the engine, or the bearing cap thereon.

Another object of the invention is to provide a fluid operated clutch in which objectionable self-energization at high rotative speed due to the development of centrifugal pressure in the body of fluid in the peripheral region of the clutch operating fluid motor, is largely eliminated. To this end, the invention contemplates the employment of a fluid motor of relatively small diameter and a system of multiplying levers for transmitting the pressure from the motor to the pressure plate of the clutch.

Another object of the invention is to provide a fluid operated clutch system of the general type providing both for free centrifugal operation and for "locked out" operation as stated above, wherein the fluid under pressure for centrifugal operation and for "locked out" operation of the clutch respectively, may be provided either by two separate pumps, or by a single pump. To this end, the fluid transmission system is arranged so that the fluid, whether from two pumps or one, is delivered to a common region of fluid pressure reaction, i. e., the fluid motor, and the manual control valve is in communication with both fluid lines through the medium of such common region, whereby the clutch may be manually controlled at any speed or gear ratio, and whereby the manual control valve is adapted to serve the additional function of a pressure control, or relief valve.

Other objects, the advantages and uses of the invention will become apparent after reading the following specification and claims, and after consideration of the drawing forming a part of the specification, wherein:

Fig. 1 is a schematic view of a portion of a motor vehicle embodying the invention;

Fig. 2 is an axial vertical sectional view through portions of the engine and the clutch;

Fig. 3 is a transverse sectional view taken on the line 3—3 of Fig. 2, illustrating the centrifugal control valve;

Fig. 4 is a transverse sectional view taken on the line 4—4 of Fig. 2, illustrating the manual control valve;

Fig. 5 is a schematic view of a portion of a motor vehicle embodying a modification of the invention; and Fig. 6 is a detail sectional view of a valve.

As an illustration of one form in which the invention may be embodied, I have shown portions of a conventional motor vehicle, including an engine having a crankshaft indicated generally at E, a flywheel F, in which is embodied a clutch C, and a transmission indicated generally at T, adapted to be coupled to the engine E through the medium of the clutch C.

The transmission T may be equipped with any form of shifting mechanism for changing the speed ratio of the gearing therein, and such shifting mechanism may be of the completely manual, semi-automatic or fully automatic type. In the drawing I have illustrated what may be termed a "semi-automatic" transmission, in which the actual work of shifting may be performed by suitable fluid-responsive mechanism acting under the control of a transmission control valve V, adapted to distribute the fluid under pressure delivered to it by a pump P', in accordance with the setting of the valve as determined by the position of a manual control lever L.

The pump P' is arranged to be driven by the transmission shaft S, or by some portion of the transmission or of the driven mechanism rearwardly of the clutch C. The pump P' may take oil through a tube 12 from an oil reservoir formed in the lower region of the transmission housing 9, and may deliver it through a tube 13 to the valve V.

The control lever L may be mounted on the vehicle steering post 10, arranged to exert its control on the valve V through the medium of a Bowden wire 11. The lever may have three positions of adjustment, designated 1, 2 and 3, corresponding to the low, intermediate and high speed ratios of the transmission, and, in addition, the conventional positions of neutral and reverse, indicated by the reference characters "N" and "R" respectively. When adjusted to the intermediate or high speed positions, the transmission may be said to be in its driving range. The other positions may be included in what I prefer to term for the purpose of this disclosure, as the starting range.

Referring now to Fig. 2, the engine E includes a main bearing 14, in which is journalled the rear trunnion portion 15 of the crankshaft 16. The trunnion portion 15 is connected to the throw trunnion 17 thereof by means of a throw-arm or cheek 18. To a flange 19 formed on the rear end of the crankshaft, is bolted the flywheel 20.

In the conventional automobile clutch, actuating pressure is exerted from the rear. According to the present invention, the driven plate 21 of the clutch C is adapted to be acted upon from the front and urged rearwardly into clutching engagement with a clutching face 22 formed on a ring 23 attached as by screws 24, to the rim of the flywheel. Pressure is applied through the medium of a pressure plate 25 which is disposed within a cavity 26 formed within the rim of the flywheel.

Axial pressure for packing the clutch is provided by a fluid motor, indicated generally at M, which also is located within the cavity 26 in the flywheel. The fluid motor M includes an axially distensible bellows 27, preferably of flexible thin sheet metal, one end of which is secured against the crank shaft flange 19 so that the bellows communicates with the end of the crank shaft, and the other end of which is attached, as at 28, to a cap 29 which closes said other end.

The cap 29 includes an annular rim portion 30 terminating in a radially outwardly extended flange 31 arranged to bear against the inner end of the thrust-multiplying levers 32. The levers 32 are fulcrumed at their outer ends against a fulcrum ring 33 positioned in the cavity 26 and engaged against the bottom of the cavity. The intermediate regions of the levers 32 are in engagement with bosses 34 formed on the pressure plate 25.

Injection of fluid under pressure into the motor M will cause the bellows 27 to expand, moving the cap 29 of the motor to the right, viewing Fig. 2, swinging the levers 32 to the right around their fulcrums, and thereby moving the pressure plate 25 against the driven plate 21 so as to cause the latter to be clamped between the pressure plate 25 and the driving face 22 of the flywheel 20.

Fluid under pressure is injected into the motor M directly from the end of the crank shaft E through an axial duct 35 in the main trunnion portion 15 thereof. One end of the duct 35 opens into the end of the crank shaft; the other end is closed.

A pump P is adapted to supply fluid to the motor M at all times when the engine is operating. A tube 40 carries the fluid from the pump P to a port 39 in a bearing cap 38 of the bearing 14, to which the tube 40 is connected as by a fitting 41. From the port 39 the fluid reaches an annular duct 37 formed in the bearing 14 and cap 38, and thence passes through radial passages 36 into the axial duct 35. The pump P is driven from the engine through the medium of a sleeve 69, carried by the flywheel ring 23, and attached to the rotor of the pump. The casing of the pump is supported against rotation by a suitable connection to the housing of the transmission T.

Interposed between the port 39 and the annular duct 37 is a relief valve chamber 42, formed in the bearing cap 38. One end of the chamber 42 is closed, as by a plug 43, and the other end opens into the end of the cap 38 to form a valve seat 44 against which a semi-spherical relief valve 45 is adapted to seat. The relief valve 45 is urged against its seat 44 by a tension spring 46, one end of which is attached to the valve 45, and the other end of which is attached to a control wire 47, communicating with a foot pedal 48 (Fig. 1), and adapted to be actuated thereby so as to variably relieve the tension of the spring 46. Such tension may be developed by the action of a compression spring 49, heavier than the spring 46, against the under side of the pedal 48, adapted to normally stretch the spring 46 to a fully distended position in which sufficient pull is developed against the valve 45 to develop the maximum desirable pressure in the fluid system.

As the tension of the spring 46 is relieved by depression of the pedal 48, the valve 45 will allow fluid to escape from the system at progressively lower pressures. Stated somewhat differently, the maximum pressure that may be maintained in the system is gradually lowered as the tension of the spring 46 is gradually relieved. The arrangement is such that the maximum pressure in the system may be lowered sufficiently to effect clutch release irrespective of the condition of operation of the centrifugal valve. Because the valve 45 provides for graduated control over the fluid pressure, it makes it possible to effect clutch engagement and disengagement under manual control in a smooth and gradual manner.

Automatic control of the pressure in the system in such a manner as to effect automatic clutch engagement in proper timing with relation to the speed of rotation of the engine, is effected by means of the automatic control valve mechanism shown in Figs. 2 and 3. Such mechanism is built into the cheek portion 18 of the crank shaft C, and may be of any of the types disclosed in the pending application of Harold Nutt and Richard L. Smirl, Serial No. 232,664. For purpose of illustration I have shown a valve comprising a valve chamber 50, one end of the chamber 50 being provided with a valve seat 51 in the form of a bushing insert. The valve 52 is slidably mounted in the valve chamber 50 and at one end has an axially extending flange 53 adapted to seat against the valve seat 51. The opposite end of the valve may be provided with piloting rings 71, and is engaged by a compression spring 72 which is compressed between the valve and the inner end of the chamber 50, and urges the valve into seating engagement with the valve seat 51.

The valve seat bushing 51 defines a port 54 which communicates through a notch 55 in one side of the bushing 51, with a port 56 formed between the main body portion of the cheek 18 and the cap portion 57 thereof, the latter being secured to the cheek by means of screws 58. The port 56 communicates with a passage 59 which in turn communicates with the axial duct 35.

The fluid pressure developed by the pump P reacts against the seating end of the valve 52 so as to tend to open the same against the pressure of the spring 72, and, when the crank shaft E is rotating, the action of centrifugal force, tending to throw the valve 52 away from the center of rotation and thus into seating engagement with the valve seat 51.

When the engine is turning over slowly, the valve 52 will yield under the pressure delivered by the pump P so as to prevent such pressure from building up sufficiently to cause clutch engagement. The fluid thus allowed to escape, will be vented through a discharge port 60 communicating with the seating end of the valve chamber 50 and opening through one side of the chank shaft cheek portion 18, as shown in Fig. 2.

As the speed of rotation of the engine increases, centrifugal force acting against the valve 52 will correspondingly increase, thereby gradually boosting the pressure in the system so as to cause the clutch C to gradually engage under the action of the motor M. During such gradual engagement, the engine will be able to smoothly pick up the load of the starting inertia of the vehicle, without jolting or lurching the vehicle, assuming that the transmission has been adjusted to first speed gear ratio. At a determined engine speed, the clutch will become fully engaged.

The operation of the transmission resulting from the engagement of the clutch will cause the transmission pump P' to become operative to deliver fluid to the valve V. When the transmission is shifted from the starting range to the driving range, the valve V will route fluid from the pump P' through a tube 61 to a port 62 in the bearing cap 38, and thence into an annular port 63 formed in the bearing 14 and cap 38, and communicating with the port 62. In the main trunnion portion 15 is a radial port 64 which communicates at one end with the annular port 63, and at its other end with an axial passage 65 formed in the trunnion portion 15 alongside the axial passage 35. One end of the passage 65 opens into the end of a crank shaft and is adapted to be closed by a flap valve 66 at such time as the pressure in the fluid motor M exceeds the pressure in the passage 65, for example, when the transmission pump P' is not operating. The other end of the passage 65 communicates with the inner end of the valve chamber 50, whereby the pressure of the fluid delivered from the pump P' may be exerted against the inner end of the valve 52.

The fluid pressure which is thus delivered by the pump P' to the inner end of the valve 52, substantially balances the pressure delivered by the pump P to the outer end of the valve 52, to such an extent that the spring 72 may maintain the valve closed against the pressure of the pump P, and the clutch will thereupon be maintained in engagement, irrespective of the speed of rotation of the engine.

The provision for communication between the duct 65 and the clutch motor M enables the vehicle driven pump P' to take over the function of the engine driven pump P when the engine is not operating, as, for example, when the vehicle is being pushed or towed in order to start the engine.

However, to prevent a flow in the reverse direction from locking out the centrifugal valve 52 which would interfere with the automatic stage of operation, the check valve 66 is provided.

The valve V has a bore 74 in which is slidable a piston 75 which is hollow and open at one end so as to communicate with the tube 13. In the side wall of the piston 75 is a port 76 adapted to communicate with the tube 61 through a port 77 in the valve casing when the transmission is adjusted to the driving range, thus establishing communication between the tube 13 and the tube 61.

In order to prevent pressure building up in the passage 65 during the automatic stage of operation, as a result of any leak that might develop in the valve 66, or seepage along the trunnion bearing 15, provision is made at the valve V for venting the passage 65 to the atmosphere inside the housing 9 during the starting range of operation. This may be taken care of by providing an annular port 78 in the piston 75, adapted to establish communication between the fluid line 61 and the interior of the housing 9 through a vent 79 in the latter when the valve is adjusted to the starting range.

At normal driving speed, the valve 52 is adapted to develop more than sufficient pressure for complete engagement of the clutch. The pressure in the system is allowed to develop to a certain extent beyond that required for complete engagement, so as to ensure against any slippage of the clutch when engaged. Beyond this limit of adequate clutch pressure, further increase in pressure is undesirable for the reason that it would impose unnecessary strain upon the operating parts of the mechanism, and would require all such parts, as well as the fluid transmission system, to be built of unduly heavy construction and materials. In the absence of other means for limiting the pressure in the system, the valve 52 would continue to build up the pressure beyond the determined maximum pressure limit, until at high speed, excessive and dangerous pressures would develop.

Provision is therefore made for limiting the pressure in the system at the determined maximum. This is accomplished by arranging the valve 45 and its operating mechanism so that, with the pedal 48 fully released, the valve 45 will open at the determined maximum pressure and serve to vent excess fluid from the system at that pressure. Thus the centrifugal valve 52 serves to control the pressure in the system in the automatic stage, up to the determined maximum or until the shift into the driving range, beyond which the pressure is controlled by the valve 45.

It will be understood that if desired, a conventional pressure relief valve may be incorporated in the pump P, for the purpose of thus determining the maximum pressure. However, by so constructing and arranging the manual valve and operating mechanism so as to be capable of functioning both as a manual control valve and as a pressure relief valve, the entire system may be constructed more simply and inexpensively.

For starting the engine by pushing or towing the vehicle, it is only necessary to adjust the transmission to the driving range. Thereupon as the pump P' is driven by the transmission, which in turn is driven by the drive wheels of the vehicle, fluid will be routed by the valve V to the axial passage 65 and will thence pass into the motor M, and into the inner end of the valve chamber 50. The valve 52 will thereupon be closed so as to allow pressure to build up in the motor M, sufficient for causing clutch engagement, without the assistance of centrifugal force for maintaining the valve 52 closed against such pressure. It is necessary that the valve be thus closed by equalization of pressure on both ends, since the engine will not turn over under push-starting conditions until after the clutch has become engaged, and thus no centrifugal force will be available for assisting in holding the valve closed against fluid pressure.

At all times when the vehicle is operating in the driving range, the clutch will be locked against disengagement even though the vehicle be slowed down to a speed wherein the engine is turning over at a rate far below that at which the clutch, under centrifugal control, would become released. This is a result of the arrangement in which the valve 52, at all times when fluid is being supplied to the secondary axial passage 65, will be subject to equal or substantially equal fluid pressures at both ends so that the pressure of the spring 72 will be adequate to maintain the valve in closed position.

Thus the clutch is subject to centrifugal control only in the starting range of low and reverse gear speed ratios, and in the driving range the vehicle may be slowed down to any speed at which it may be driven by the engine, for driving in congested traffic, without danger of clutch slippage.

Another advantage of the arrangement in which both pumps deliver to the motor M, is that the clutch may be released under manual control at any engine or vehicle speed, irrespective of what gear ratio may be in operation.

By providing an arrangement wherein the fluid stream for centrifugal operation and the fluid stream for maintaining the valve 52 closed are both delivered to the common pressure chamber within the motor M, it becomes possible to employ a single fluid pump as shown in Fig. 5, providing that it is permissible to dispense with the push starting function. Fig. 5 illustrates how the conventional oil pump P'' of the automobile engine E, driven in a conventional manner from the engine, may be employed to deliver fluid through a line 40A to the port 39 for centrifugal operation, and through a branch line 61a, 61b, to the port 62. The delivery of fluid to the port 62, which is desired only in the driving range of gear ratios, may be controlled by a valve operated by the conventional manual gear shift lever L'. To this end, a valve 75, operated from the shift rail 76 of the gear shift mechanism, is interposed in the line 61a, 61b, and as shown in the aforesaid application, may close the line 61a, 61b, when the gearing is adjusted to the starting range, and may open the line 61a, 61b when the gearing is adjusted to the driving range.

The line 6 shown in Fig. 5, is the conventional fluid line for lubricating the engine bearings, etc.

I claim:

1. In a clutch system for coupling a driven member to a prime mover having a crankshaft, a fluid operated clutch, means for delivering fluid under pressure to said clutch for operating the same, and means for controlling the pressure of such fluid and thereby controlling the engagement and disengagement of the clutch, comprising a centrifugal valve mounted in the crankshaft and adapted to move, under the urge of centrifugal force and against the pressure of the fluid acting on said clutch, toward a closed position wherein it permits the fluid pressure to build up for effecting clutch engagement.

2. A clutch system for coupling the transmission of an automotive vehicle to the engine thereof, comprising a clutch, a fluid motor for causing the clutch to engage, means for delivering fluid under pressure to said motor, and means for controlling the pressure of such fluid and thereby controlling the engagement and disengagement of the clutch, comprising a centrifugal valve mounted in the crankshaft and adapted to relieve fluid pressure in the system in accordance with the speed of rotation of the crankshaft.

3. In a clutch system for coupling a driven member to a prime mover having a crankshaft and a flywheel mounted on the end of said crankshaft, a fluid operated clutch associated with said flywheel, including a fluid motor, a duct formed in said crankshaft for conveying fluid under pressure to said motor, and a centrifugal valve mounted in the crankshaft and adapted to move, under centrifugal force and against the pressure of the fluid in said duct, toward a closed position so as to variably control the pressure of fluid in said duct in response to changes in speed of rotation of said crankshaft.

4. A hydraulic clutch system for coupling the transmission of an automotive vehicle to the engine thereof, comprising a clutch, a fluid motor for effecting engagement of said clutch, fluid pumps driven by the engine and transmission respectively, connections for conveying fluid from said engine pump to said motor for causing speed-responsive engagement of said clutch, a centrifugal valve mounted in the crankshaft and adapted to relieve fluid pressure in said connections in accordance with the speed of rotation of the crankshaft for controlling said speed-responsive engagement, and connections for delivering fluid from said transmission pump to said valve to exert force upon the same against pressure relieving movement whereby to maintain the clutch in engagement irrespective of speed of rotation.

5. In a clutch system for coupling a driven member to a prime mover having a crank shaft and a flywheel mounted on the end of said crank shaft, said flywheel being hollow and providing an internal driving friction face, a pressure plate disposed within the flywheel, a driven element interposed between the pressure plate and said friction face, a fluid motor, of smaller diameter than said pressure plate, disposed in the central region of the flywheel interior in communication with the end of the crank shaft, and force multiplying lever mechanism extending radially and operatively interposed between the periphery of said fluid motor and said pressure plate for transmitting, from the fluid motor to the pressure plate, pressure for moving the plate into clutching engagement with said driven member, said crank shaft being formed with a duct communicating through the end of the crank shaft with said fluid motor, and adapted to convey to the motor, fluid under pressure for operating the same.

6. A clutch system as defined in claim 5, including centrifugal valve mechanism mounted in said crank shaft and arranged to control the pressure of the fluid acting on said motor.

7. A clutch system as defined in claim 5, including a main bearing wherein said crank shaft is journalled, and a manually controlled valve in said main bearing in communication with said duct, for manually controlling the pressure of the fluid in said motor.

8. In a clutch system for coupling the transmission of a motor vehicle to its engine, having a crank shaft and a main bearing in which a rear end portion of said crank shaft is journalled, and having a flywheel attached to said rear end portion, a clutch associated with said flywheel, a fluid motor disposed within said flywheel and arranged to operate said clutch, a duct extending longitudinally in said rear end portion of the crankshaft, one end of said duct communicating through the end of the crankshaft with said fluid motor for delivering fluid under pressure thereto, an annular duct defined between said bearing and said crank shaft and communicating with said longitudinal duct for conveying clutch operating fluid thereto, means for delivering fluid under pressure to said annular duct, a fluid escape port communicating with said annular duct, and a manually controlled valve for closing said port.

9. A clutch system as defined in claim 8, including a centrifugal pressure controlling valve disposed in a cheek of said crank shaft and communicating with said longitudinal duct for controlling the pressure of the fluid therein.

10. A clutch system as defined in claim 8, including a centrifugal valve disposed in a cheek of said crank shaft, a pressure relief port in said cheek adapted to be closed by said valve acting centrifugally, said port communicating with said longitudinal duct and said valve closing against the pressure of the fluid therein whereby to control the pressure in said motor centrifugally.

11. A clutch system as defined in claim 8, including a centrifugal valve disposed in a cheek of said crank shaft, a pressure relief port in said cheek adapted to be closed by said valve acting centrifugally, said port communicating with said longitudinal duct and said valve closing against the pressure of the fluid therein whereby to control the pressure in said motor centrifugally, a second annular duct defined between said crank shaft and said bearing, a second longitudinal duct in said crank shaft, communicating with said second annular duct, communicating at one end with the end of said valve opposite its sealing end so as to deliver fluid under pressure thereto for supplementing centrifugal force in closing the valve, and communicating at its other end through the end of said crank shaft with said fluid motor for delivering fluid under pressure thereto, means for delivering fluid under pressure to said first annular duct, means for delivering fluid under pressure to said second annular duct, and a check valve for preventing the passage of fluid from said motor into said second longitudinal duct.

RICHARD L. SMIRL.